(12) United States Patent
Kato

(10) Patent No.: US 10,971,796 B2
(45) Date of Patent: Apr. 6, 2021

(54) WIRELESS COMMUNICATION DEVICE

(71) Applicant: Murata Manufacturing Co., Ltd., Nagaokakyo (JP)

(72) Inventor: Noboru Kato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/554,812

(22) Filed: Aug. 29, 2019

(65) Prior Publication Data

US 2019/0386376 A1     Dec. 19, 2019

Related U.S. Application Data

(63) Continuation of application No. PCT/JP2018/009141, filed on Mar. 9, 2018.

(30) Foreign Application Priority Data

Mar. 9, 2017   (JP) .............................. JP2017-045457

(51) Int. Cl.
*H01Q 1/22* (2006.01)
*H01Q 5/10* (2015.01)
*H01Q 5/335* (2015.01)

(52) U.S. Cl.
CPC .............. *H01Q 1/2225* (2013.01); *H01Q 5/10* (2015.01); *H01Q 5/335* (2015.01)

(58) Field of Classification Search
CPC ......... H01G 1/2225; H01G 5/10; H01G 5/332
See application file for complete search history.

(56) References Cited

U.S. PATENT DOCUMENTS

| 2010/0308118 A1 | 12/2010 | Kataya |
| 2013/0194149 A1* | 8/2013 | Kimura ............ G06K 19/07773 |
| | | 343/803 |
| 2016/0353619 A1 | 12/2016 | Kato et al. |
| 2017/0017872 A1 | 1/2017 | Kato et al. |
| 2017/0367226 A1 | 12/2017 | Kato et al. |

FOREIGN PATENT DOCUMENTS

| JP | 2012165108 A | 8/2012 |
| JP | 5910883 B2 | 4/2016 |
| WO | 2007083574 A1 | 7/2007 |
| WO | 2009128437 A1 | 10/2009 |
| WO | 2016072301 A1 | 5/2016 |
| WO | 2016203882 A1 | 12/2016 |

OTHER PUBLICATIONS

International Search Report issued for PCT/JP2018/009141, dated Jun. 5, 2018.
Written Opinion of the International Searching Authority issued for PCT/JP2018/009141, dated Jun. 5, 2018.

* cited by examiner

*Primary Examiner* — Graham P Smith
(74) *Attorney, Agent, or Firm* — Arent Fox LLP

(57) ABSTRACT

A wireless communication device having a feeding circuit that includes an RFIC chip; and antenna elements connected to the feeding circuit. The feeding circuit FC further includes a first resonant loop including the RFIC chip and multiple inductance elements; and a second resonant loop including a capacitance element and multiple inductance elements. Moreover, the inductance elements of each of the first and second resonant loops, the shared inductance elements are included. The second resonant loop includes an antenna port for connection to the antenna elements.

20 Claims, 10 Drawing Sheets

P1: 700MHz
P2: f1
P3: f2
P4: 1400MHz

WIRELESS COMMUNICATION DEVICE

CROSS REFERENCE TO RELATED APPLICATIONS

The present application is a continuation of PCT/JP2018/009141 filed Mar. 9, 2018, which claims priority to Japanese Patent Application No. 2017-045457, filed Mar. 9, 2017, the entire contents of each of which are incorporated herein by reference.

TECHNICAL FIELD

The present invention relates to a wireless communication device.

BACKGROUND

Currently, there are radio-frequency identification (RFID) tags that are capable of wireless communication at a plurality of communication frequencies for existing wireless communication devices. For example, in the case of a wireless communication device described in Patent Document 1, a loop including a radio-frequency integrated circuit (RFIC) chip exists in a circuit, with a half-wavelength dipole antenna being connected to the loop.

Patent Document 1: Japanese Patent No. 5910883.

Incidentally, in the wireless communication device described in Patent Document 1, the half-wavelength dipole antenna is used as an antenna element so that wireless communication is possible at a plurality of communication frequencies. For this reason, the shape and size of the antenna element are limited. That is, the antenna element has a low degree of design freedom. Such an antenna element lowers the degree of design freedom of the entire wireless communication device.

SUMMARY OF THE INVENTION

Therefore, the exemplary embodiments of the present invention are designed to enable the wireless communication device to perform wireless communication at a plurality of communication frequencies without lowering the degree of design freedom of the antenna element.

Thus, according to an exemplary aspect of the present invention, a wireless communication device is provided having a feeding circuit including an RFIC chip; and an antenna element connected to the feeding circuit. Moreover, the feeding circuit includes a first resonant loop including the RFIC chip and a plurality of inductance elements; and a second resonant loop including a capacitance element and a plurality of inductance elements. In the plurality of inductance elements in the first resonant loop and the plurality of inductance elements in the second resonant loop, a shared inductance element is included that is shared by the first resonant loop and the second resonant loop, and the second resonant loop includes an antenna port for connection to the antenna element.

According to the exemplary embodiments of the present invention, the wireless communication device is configured to perform wireless communication at a plurality of communication frequencies without lowering the degree of design freedom of the antenna element.

DETAILED DESCRIPTION

Figure 1:
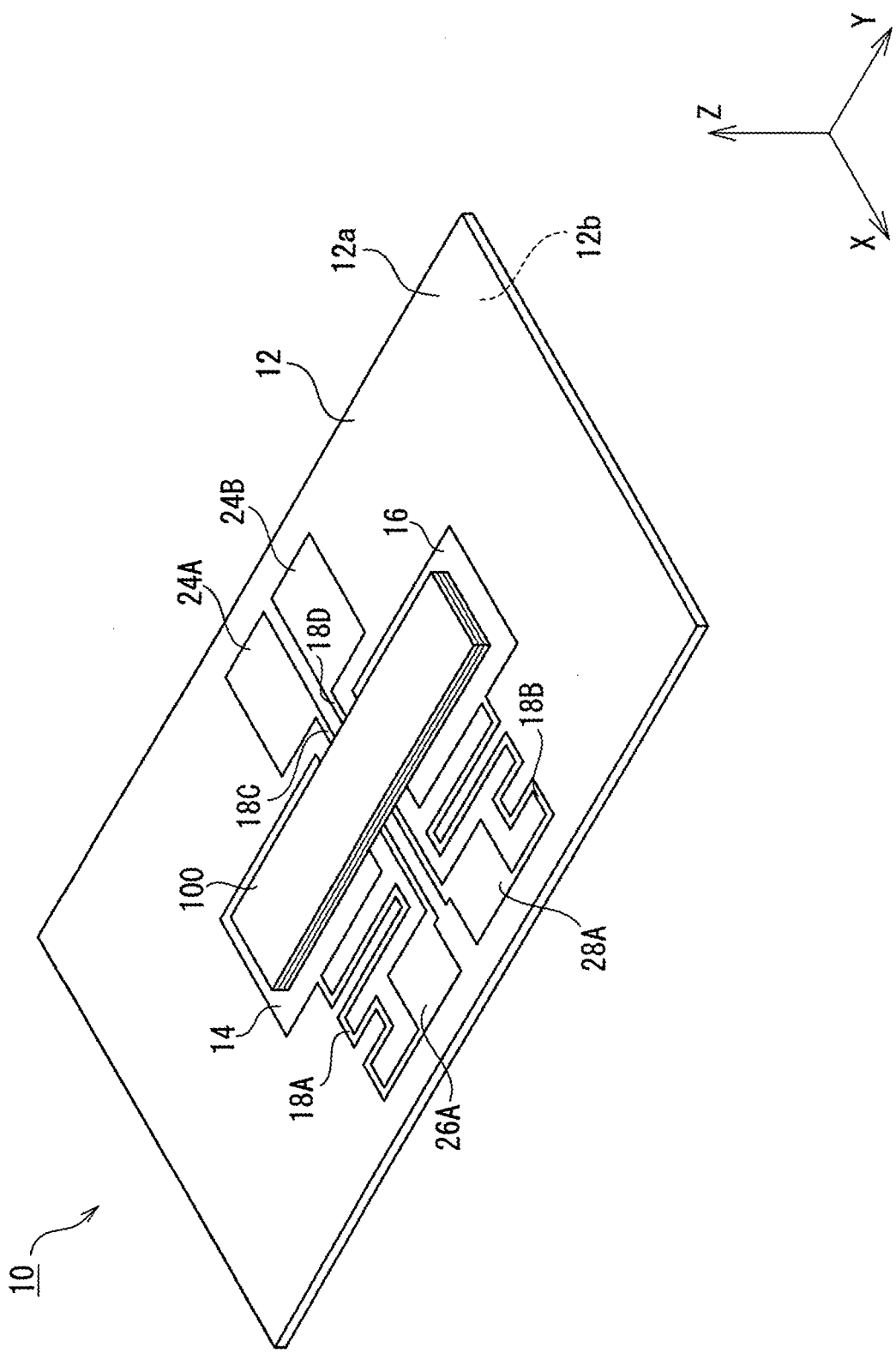
FIG. 1 is a perspective view of a wireless communication device according to an exemplary embodiment.

A wireless communication device of an exemplary aspect of the present invention includes a feeding circuit including an RFIC chip; and an antenna element connected to the feeding circuit. The feeding circuit includes a first resonant loop including the RFIC chip and a plurality of inductance elements; and a second resonant loop including a capacitance element and a plurality of inductance elements. In the plurality of inductance elements in the first resonant loop and the plurality of inductance elements in the second resonant loop, a shared inductance element is included that is shared by the first resonant loop and the second resonant loop, and the second resonant loop includes an antenna port for connection to the antenna element.

According to this exemplary aspect, the wireless communication device is configured to perform wireless communication at a plurality of communication frequencies without reducing the degree of design freedom of the antenna element.

In an exemplary aspect, a T-type circuit is provided that includes an inductance element included in only the first resonant loop, an inductance element included in only the second resonant loop, and the shared inductance element. Thus, the three inductance elements perform impedance transformations mutually, allowing current to flow through each of the first loop and the second loop without great loss and without being greatly biased to one side.

In another exemplary aspect, in the three inductance elements making up the T-type circuit, the inductance of the inductance element included in only the first resonant loop is larger than the inductance of the shared inductance element. In this case, the first resonant loop can obtain a predetermined first resonance frequency without being substantially affected by the resonance frequency of the second resonant loop. Since the RFIC chip is included in this first resonant loop, the RFIC chip can operate at a predetermined frequency. In the case where the inductance (i.e., the inductance value) of the inductance element included in only the second resonant loop is greater than the inductance of the shared inductance element, the second resonant loop is configured to obtain a predetermined second resonance frequency without being substantially affected by the resonance frequency of the first resonant loop. By employing the structure in which the antenna element is connected to this second resonant loop, two resonances can be obtained without being affected by the electrical length of the antenna element, with the result that the two, first and second resonant loops are formed as the current paths even through the electrical length of the antenna element is small. As a result, the wireless communication device has two resonance frequencies, thereby rendering wireless communication feasible at a plurality of communication frequencies.

In another exemplary aspect, the feeding circuit includes a first inductance element that is an inductance element included in only the first resonant loop, with the first inductance element having one end connected to a first input/output terminal of the RFIC chip; a second inductance element that is an inductance element included in only the first resonant loop, with the second inductance element having one end connected to a second input/output terminal of the RFIC chip; a third inductance element that is the shared inductance element, with the third inductance element having one end connected to the other end of the first inductance element; a fourth inductance element that is the shared inductance element, with the fourth inductance element having one end connected to the other end of the second inductance element and the other end connected to the other end of the third inductance element; a fifth inductance element that is an inductance element included in only the second resonant loop, with the fifth inductance element having one end connected to the other end of the first inductance element; a sixth inductance element that is an inductance element included in only the second resonant loop, with the sixth inductance element having one end connected to the other end of the second inductance element; a seventh inductance element having one end connected to the other end of the fifth inductance element and the other end connected to one end of the capacitance element; and an eighth inductance element having one end connected to the other end of the sixth inductance element and the other end connected to the other end of the capacitance element. In this aspect, the first resonant loop includes the first to fourth inductance elements and the RFIC chip, the second resonant loop includes the third to eighth inductance elements and the capacitance element, and the antenna port is disposed between the fifth inductance element and the seventh inductance element and between the sixth inductance element and the eighth inductance element.

In another exemplary aspect, the wireless communication device has an RFIC module in the form of a multilayer substrate on which the RFIC chip is mounted and on which the first to fourth inductance elements are disposed as conductor patterns; and a base material on which the RFIC module is mounted and on which the antenna element, the fifth to eighth inductance elements, and the capacitance element are disposed as conductor patterns.

In another exemplary aspect, the wireless communication device has an RFIC module in the form of a multilayer substrate on which the RFIC chip is mounted and on which the first to eighth inductance elements and the capacitance element are disposed as conductor patterns; and a base material on which the RFIC module is mounted and on which the antenna element is disposed as a conductor pattern.

In another exemplary aspect, the feeding circuit includes a first inductance element that is an inductance element included in only the first resonant loop, with the first inductance element having one end connected to a first input/output terminal of the RFIC chip; a second inductance element that is an inductance element included in only the first resonant loop, with the second inductance element having one end connected to a second input/output terminal of the RFIC chip; a third inductance element that is the shared inductance element, with the third inductance element having one end connected to the other end of the first inductance element and the other end connected to one end of the capacitance element; a fourth inductance element that is the shared inductance element, with the fourth inductance element having one end connected to the other end of the second inductance element and the other end connected to the other end of the capacitance element; a fifth inductance element that is an inductance element included in only the second resonant loop, with the fifth inductance element having one end connected to the other end of the first inductance element; a sixth inductance element that is an inductance element included in only the second resonant loop, with the sixth inductance element having one end connected to the other end of the second inductance element; a seventh inductance element having one end connected to the other end of the fifth inductance element; and an eighth inductance element having one end connected to the other end of the sixth inductance element, with the eighth inductance element having the other end connected to the other end of the seventh inductance element. In this aspect, the first resonant loop includes the first to fourth inductance elements, the RFIC chip, and the capacitance element, the second resonant loop includes the third to eighth inductance elements and the capacitance element, and the antenna port is disposed between the fifth inductance element and the seventh inductance element and between the sixth inductance element and the eighth inductance element.

In another exemplary aspect, the wireless communication device has an RFIC module in the form of a multilayer substrate on which the RFIC chip is mounted and on which the first to fourth inductance elements and the capacitance element are disposed as conductor patterns; and a base material on which the RFIC module is mounted and on which the antenna element and the fifth to eighth inductance elements are disposed as conductor patterns.

In another exemplary aspect, the wireless communication device has an RFIC module in the form of a multilayer substrate on which the RFIC chip is mounted and on which the first to eighth inductance elements and the capacitance element are disposed as conductor patterns; and a base material on which the RFIC module is mounted and on which the antenna element is disposed as a conductor pattern.

In an exemplary aspect, the electrical length of the antenna element may be less than a half of the wavelength of a communication radio wave. Hence, the wireless communication device can be reduced in size.

In an exemplary aspect, the antenna element may configure a dipole antenna.

A detailed description of the exemplary embodiments of the present invention will now be described with reference to the drawings as follows.

Figure 2:
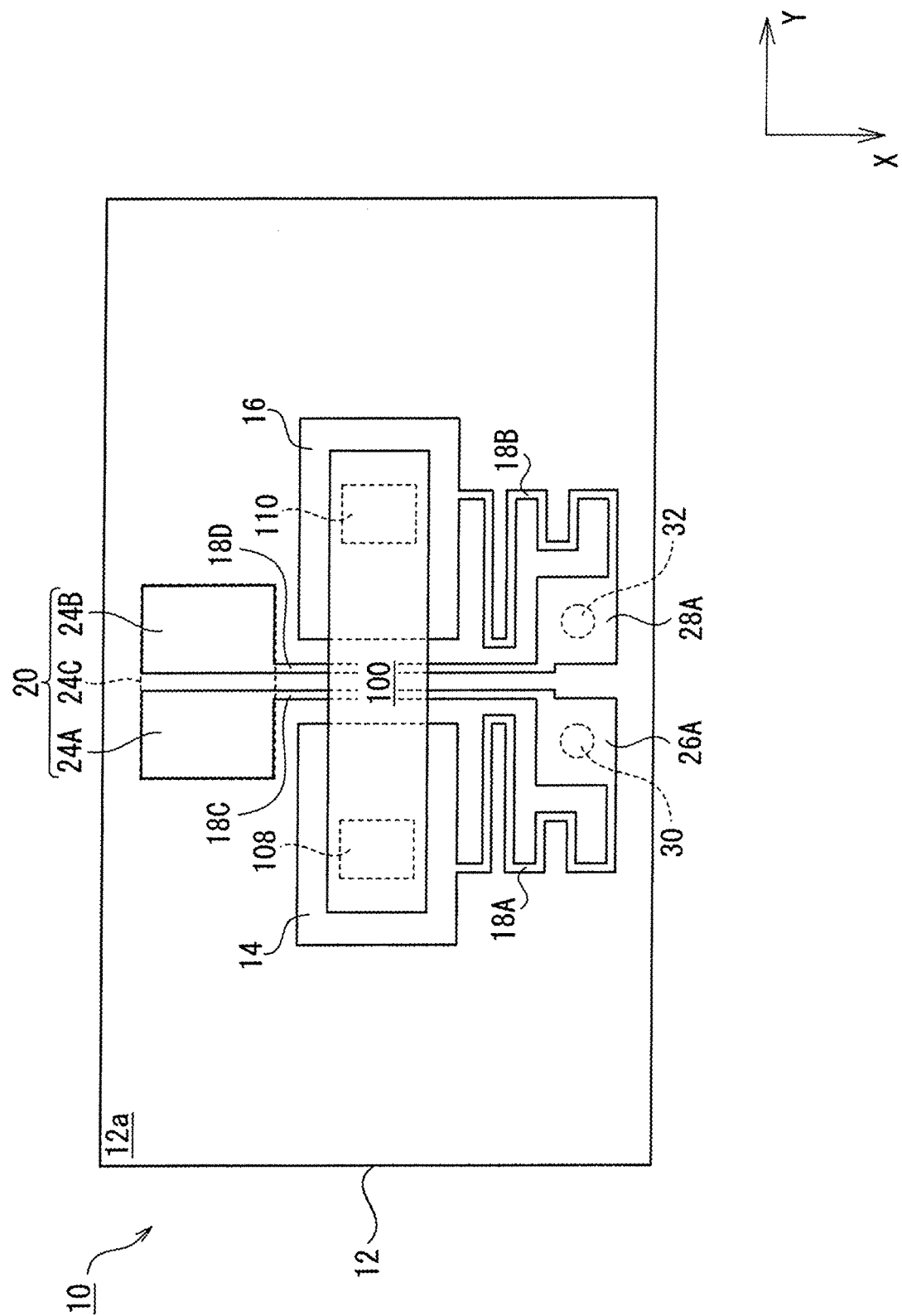
FIG. 2 is a top view of the wireless communication device shown in FIG. 1.
Figure 3:
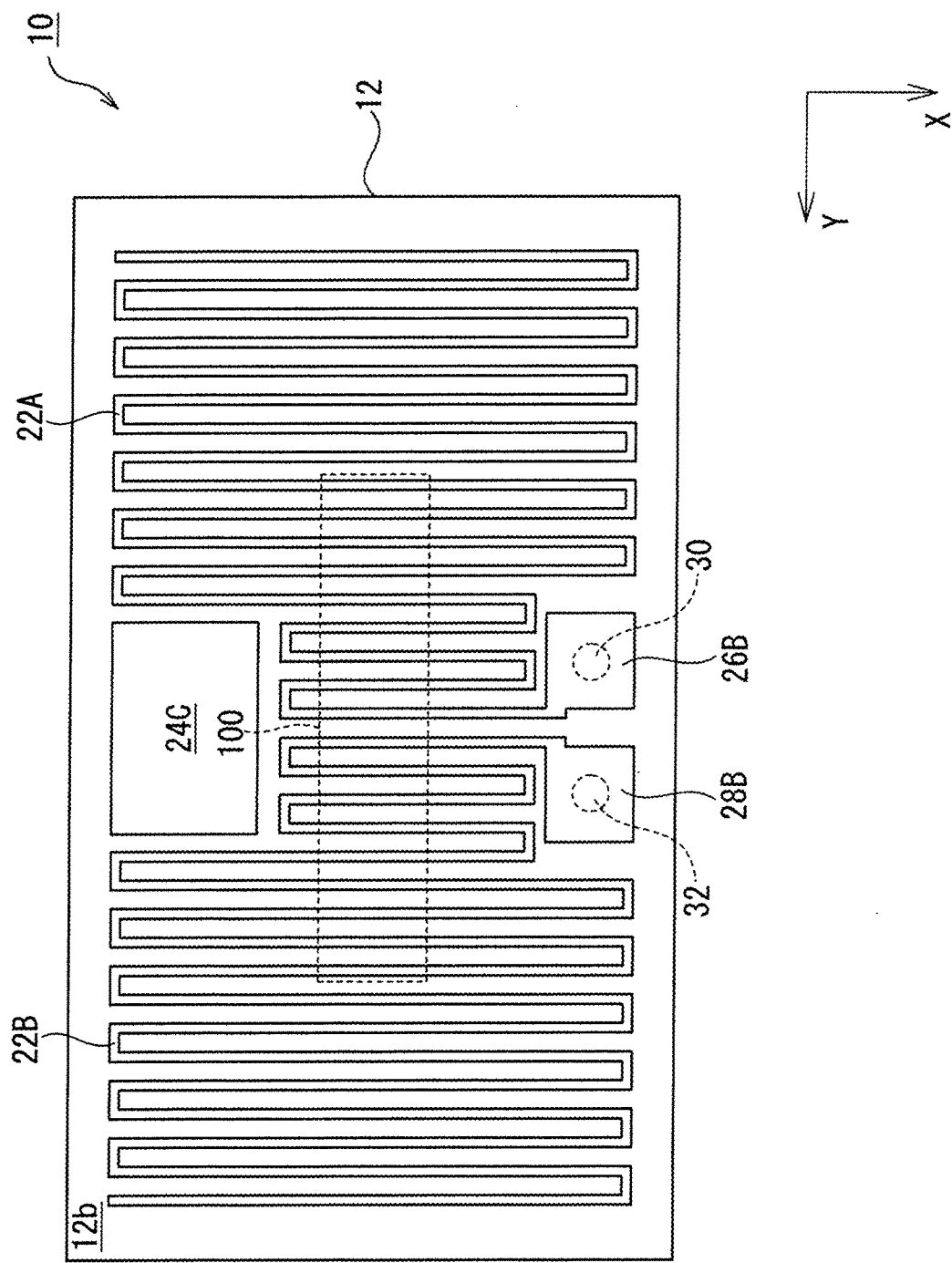
FIG. 3 is a bottom view of the wireless communication device shown in FIG. 1.
Figure 4:
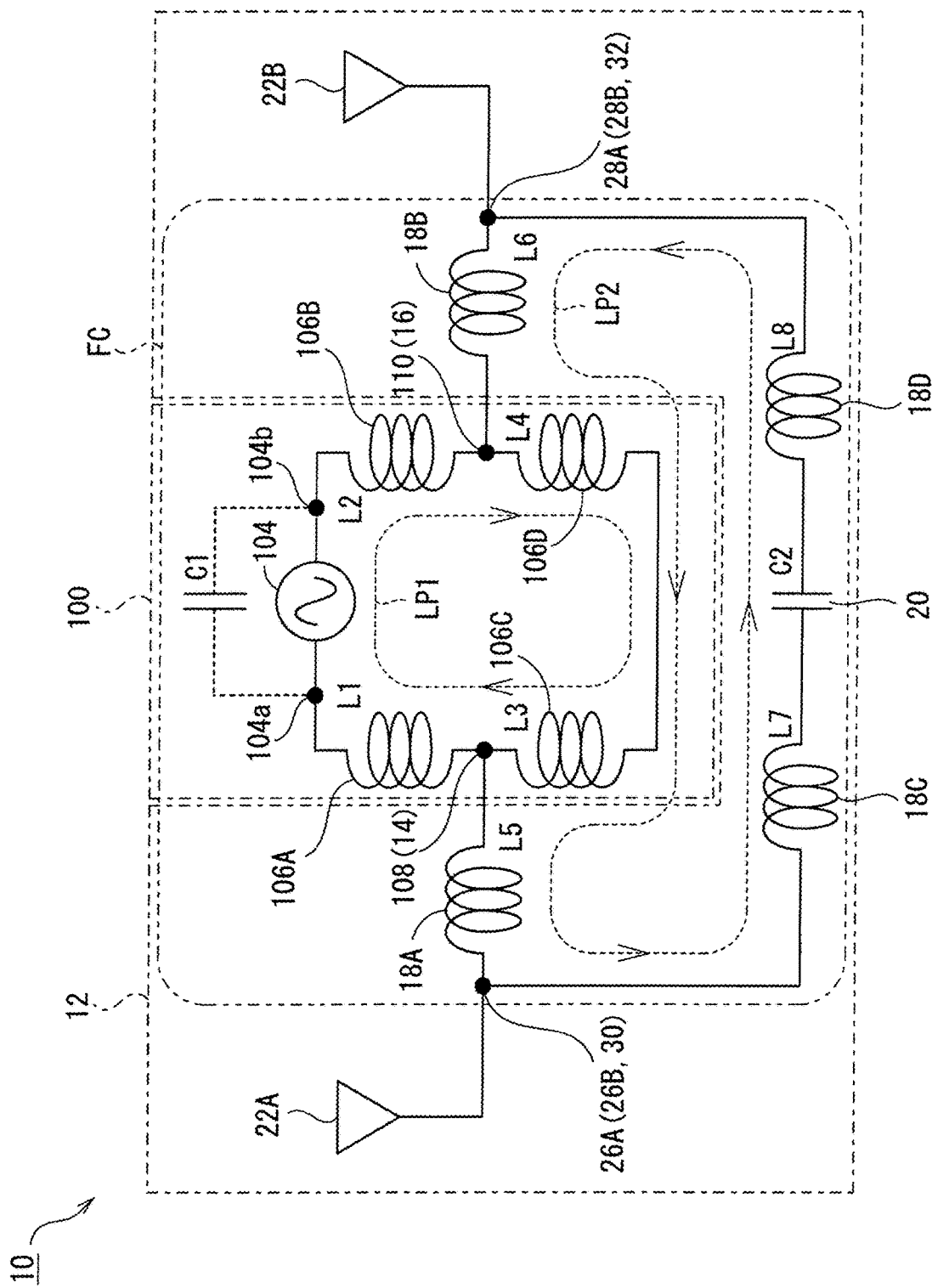
FIG. 4 is a view showing an overall configuration and an equivalent circuit of the wireless communication device shown in FIG. 1.

FIG. 1 is a perspective view of a wireless communication device according to an exemplary embodiment of the present invention; FIG. 2 is a top view; and FIG. 3 is a bottom view. Furthermore, FIG. 4 shows an overall configuration and an equivalent circuit of the wireless communication device. It is noted the for description purposes, an X-Y-Z coordinate system in the diagram represents a thickness direction by a Z-axis. This X-Y-Z coordinate system is to facilitate the understanding of the invention and is not intended to limit the invention.

As shown in FIG. 1, a wireless communication device 10 is a radio-frequency identification (RFID) tag configured to perform wireless communication at UHF-band communication frequencies. Although details will be described later, the wireless communication device 10 is configured to communicated wirelessly at a plurality of communication frequencies allowing communication at practical communication distances. Thus, according to the exemplary aspect, the wireless communication device 10 is configured for wireless communication at a frequency in the vicinity of a certain communication frequency and at a frequency in the vicinity of another communication frequency different from the certain communication frequency.

As shown the wireless communication device 10 includes a radio-frequency integrated circuit (RFIC) module 100, and a base material 12 mounted with the RFIC module 100.

Figure 5:
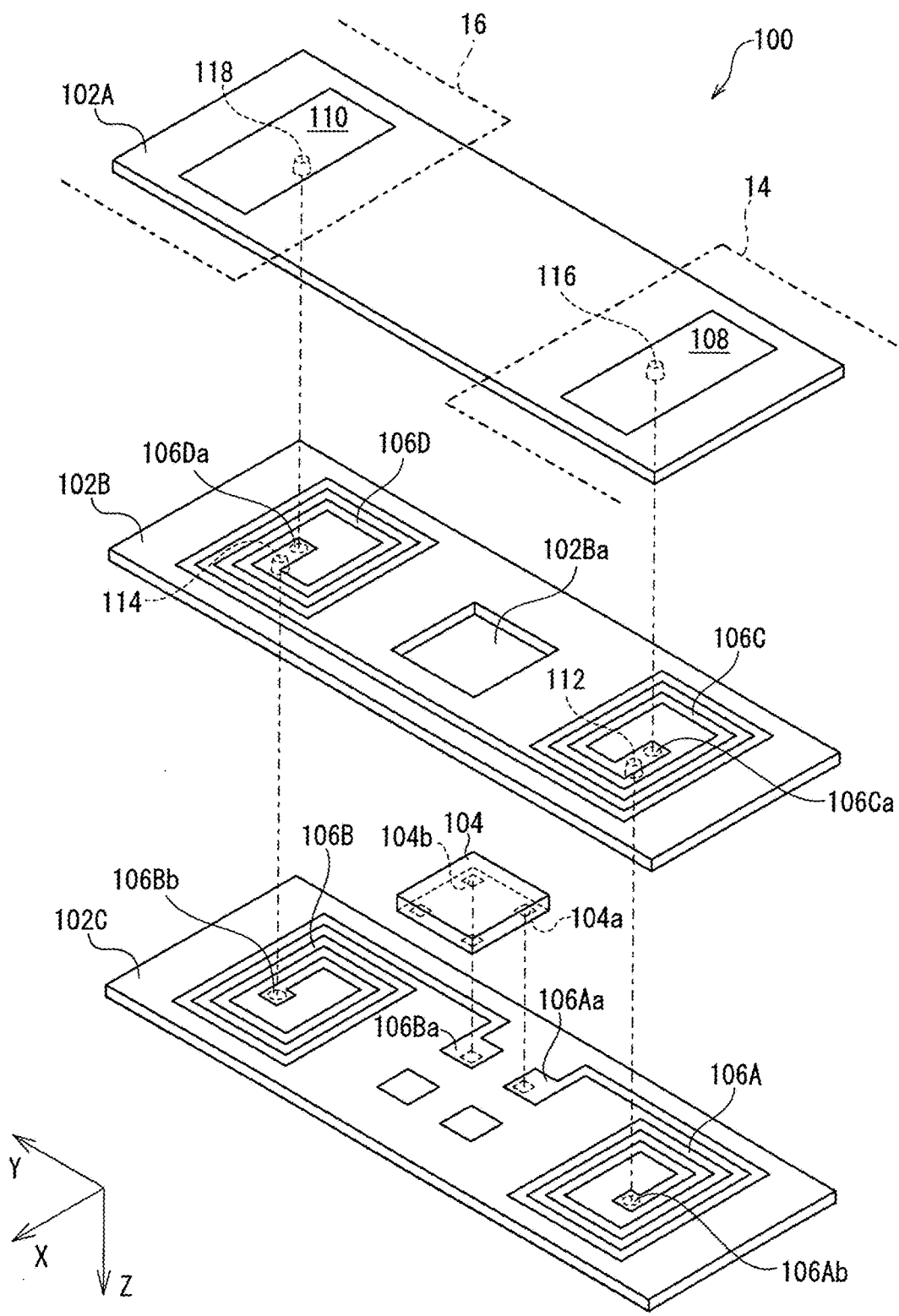
FIG. 5 is an exploded perspective view of an RFIC module.

Details of the RFIC module 100 will first be described. FIG. 5 is an exploded perspective view of the RFIC module.

In the case of this embodiment, as shown in FIG. 5, the RFIC module 100 is a multilayer substrate composed of three layers. Specifically, the RFIC module 100 is configured by laminating insulation sheets 102A, 102B, and 102C having a flexibility, made of resin materials such as polyimide and liquid crystal polymer. FIG. 5 shows the state where the RFIC module 100 shown in FIG. 1 is inverted and disassembled.

As shown in FIG. 5, the RFIC module 100 includes an RFIC chip 104, a plurality of inductance elements 106A, 106B, 106C, and 106D, and external connection terminals 108, 110. In the exemplary embodiment, the inductance elements 106A to 106D and the external connection elements 108, 110 are formed on the insulation sheets 102A to 102C and are configured from conductor patterns made of a conductive material such as copper.

As shown in FIG. 5, the RFIC chip 104 is mounted at a central portion in the longitudinal direction (Y-axis direction) on the insulation sheet 102C. The RFIC chip 104 has a structure in which various elements are incorporated into a semiconductor substrate made of a semiconductor such as silicon. The RFIC chip 104 includes a first input/output terminal 104a and a second input/output terminal 104b. Furthermore, as shown in FIG. 4, the RFIC chip 104 has an internal capacitance C1 (self-capacitance of the RFIC chip itself).

As shown in FIG. 5, the inductance element (i.e., a first inductance element) 106A is configured from a conductor pattern that is disposed in the form of a spiral coil on the insulation sheet 102C, on one side in the longitudinal direction (i.e., the Y-axis direction) of the insulation sheet 102C. Moreover, as shown in FIG. 4, the inductance element 106A has an inductance L1. A land 106Aa connected to the first input/output terminal 104a of the RFIC chip 104 is disposed at one end (i.e., an outside end of the coil) of the inductance element 106A. A land 106Ab is also disposed at the other end (i.e., a center end of the coil).

As shown in FIG. 5, the inductance element (i.e., a second inductance element) 106B is configured from a conductor pattern that is disposed in the form of a spiral coil on the insulation sheet 102C, on the other side in the longitudinal direction (i.e., in the Y-axis direction) of the insulation sheet 102C. Moreover, as shown in FIG. 4, the inductance element 106B has an inductance L2. A land 106Ba connected to the second input/output terminal 104b of the RFIC chip 104 is disposed at one end (i.e., an outside end of the coil) of the inductance element 106B. A land 106Bb is also disposed at the other end (i.e., a center end of the coil).

As shown in FIG. 5, the inductance element (i.e., a third inductance element) 106C is configured from a conductor pattern that is disposed in the form of a spiral coil on the insulation sheet 102B, on one side in the longitudinal direction (i.e., in the Y-axis direction) of the insulation sheet 102B. The inductance element 106C confronts the inductance element 106A in the laminated direction (i.e. in the Z-axis direction). Moreover, as shown in FIG. 4, the inductance element 106C has an inductance L3. A land 106Ca is disposed at one end (i.e., a center end of the coil) of the inductance element 106C. This land 106Ca is connected to the land 106Ab of the inductance element 106A on the insulation sheet 102C, via an interlayer connection conductor 112 such as a through hole conductor passing through the insulation sheet 102B.

As shown in FIG. 5, the inductance element (i.e., a fourth inductance element) 106D is configured from a conductor pattern that is disposed in the form of a spiral coil on the insulation sheet 102B, on the other side in the longitudinal direction (i.e., the Y-axis direction) of the insulation sheet 102B. The inductance element 106D confronts the inductance element 106B in the laminated direction (i.e., in the Z-axis direction). Moreover, as shown in FIG. 4, the inductance element 106D has an inductance L4. A land 106Da is disposed at one end (i.e., a center end of the coil) of the inductance element 106D. This land 106Da is connected to the land 106Bb of the inductance element 106B on the insulation sheet 102C, via the interlayer connection conductor 114 such as the through hole conductor passing through the insulation sheet 102B.

It is noted that the inductance elements 106C, 106D on the insulation sheet 102B are integrated together as a single conductor pattern. That is, their respective other ends (outside ends of the coils) are connected to each other. Moreover, a through hole 102Ba accommodating the RFIC chip 104 mounted on the insulation sheet 102C is formed in the insulation sheet 102B.

As shown in FIG. 5, the external connection terminals 108, 110 are configured from conductor patterns disposed on the insulation sheet 102A. The external connection terminals 108, 110 confront each other in the longitudinal direction (Y-axis direction) of the insulation sheet 102A.

The external connection terminal 108 on one hand is connected to the land 106Ca of the inductance element 106C on the insulation sheet 102B, via an interlayer connection conductor 116 such as a through hole conductor passing through the insulation sheet 102A.

The external connection terminal 110 on the other hand is connected to the land 106Da of the inductance element 106D on the insulation sheet 102B, via an interlayer connection conductor 118 such as the through hole conductor passing through the insulation sheet 102A.

The RFIC chip 104 is in the form of a semiconductor substrate. The RFIC chip 104 lies between the inductance elements 106A and 106B and between the inductance elements 106C and 106D. This RFIC chip 104 functions as a shield so that magnetic field coupling and capacitive coupling are suppressed between the spirally-coiled inductance elements 106A and 106B disposed on the insulation sheet 102C. Similarly, magnetic field coupling and capacitive coupling are suppressed between the spirally-coiled inductance elements 106C and 106D disposed on the insulation sheet 102B. As a result, the passband of the communication signal is suppressed from becoming narrow.

Referring back to FIG. 1, the base material 12 mounted with the RFIC module 100 is a sheet made of an insulation material and is made of e.g. a resin material having a flexibility. The base material 12 includes a first main surface 12a mounted with the RFIC module 100, and a second main surface 12b that is a reverse side to the first main surface 12a.

As shown in FIG. 2, input/output pads 14, 16, inductance elements 18A, 18B, 18C, and 18D, and a capacitance element 20 are disposed on the first main surface 12a of the base material 12.

On the other hand, as shown in FIG. 3, antenna elements 22A, 22B are disposed on the second main surface 12b of the base material 12.

In the exemplary embodiment, the input/output pads 14, 16 and the inductance elements 106A to 106D on the first main surface 12a of the base material 12 are configured from conductor patterns made of conductive materials such as copper, for example. Similarly, the antenna elements 22A, 22B on the second main surface 12b of the base material 12 are also configured from a conductor pattern made of a conductive material.

According to the exemplary aspect, the capacitance element 20 includes counter electrodes 24A, 24B made of a conductive material, disposed on the first main surface 12a; and a counter electrode 24C made of a conductive material, disposed on the second main surface 12b. The counter electrodes 24A, 24B confront the counter electrode 24C in the thickness direction (i.e., the Z-axis direction) of the base material 12, to form a capacitance therebetween. As shown in FIG. 4, the counter electrodes 24A to 24C of the capacitance element 20 are formed in size having a capacitance C2.

Relay lands 26A, 26B, 28A, and 28B are respectively disposed on the first main surface 12a and the second main surface 12b, for connection of the conductor patterns on the first main surface 12a and the conductor patterns on the second main surface 12b. The relay lands 26A and 26B are connected by an interlayer connection conductor 30 such as a through hole conductor passing through the base material 12. Similarly, the relay lands 28A and 28b are also connected by an interlayer connection conductor 32. The relay lands 26A, 26B and the interlayer connection conductor 30 function as an antenna port for connection to the antenna element 22A. The relay lands 28A, 28B and the interlayer connection conductor 32 function as an antenna port for connection to the antenna element 22B.

The input/output pad 14 on one hand connects to the external connection terminal 108 on one hand of the RFIC module 100. The input/output pad 16 on the other hand connects to the external connection terminal 110 on the other hand of the RFIC module 100. These connections are performed e.g. via solder or a conductive adhesive.

As shown in FIG. 2, the input/output pads 14, 16 are larger than the external connection terminals 108, 110 of the RFIC module 100. In consequence, even if variations occur in positioning of the RFIC module 100 on the base material 12, the input/output pads 14, 16 and the external connection terminals 108, 110 can connect via the same contact area. As a result, even if variations occur in positioning of the RFIC module 100 on the base material 12, the communication characteristics of the wireless communication device 10 do not undergo variations.

The inductance element (i.e., fifth inductance element) 18A on the first main surface 12a of the base material 12 has one end connected to the input/output pad 14 and the other end connected to the relay land 26A. That is, the inductance element 18A connects via the input/output pad 14 and the external connection terminal 108 to the inductance element 106A within the RFIC module 100. The inductance element 18A extends with a predetermined electrical length in a meandering manner in order to have an inductance L5, as shown in FIG. 4.

The inductance element (i.e., a sixth inductance element) 18B has one end connected to the input/output pad 16 and the other end connected to the relay land 28A. That is, the inductance element 18B connects via the input/output pad 16 and the external connection terminal 110 to the inductance element 106B within the RFIC module 100. The inductance element 18B extends with a predetermined electrical length in a meandering manner in order to have an inductance L6, as shown in FIG. 4.

The inductance element (i.e., seventh inductance element) 18C has one end connected to the relay land 26A and the other end connected to one end (i.e., the counter electrode 24A) of the capacitance element 20. The inductance element 18C extends with a predetermined electrical length in order to have an inductance L7, as shown in FIG. 4.

The inductance element (i.e., an eighth inductance element) 18D has one end connected to the relay land 28A and the other end connected to the other end (i.e., the counter electrode 24B) of the capacitance element 20. The inductance element 18D extends with a predetermined electrical length in order to have an inductance L8, as shown in FIG. 4.

As shown in FIG. 3, the antenna element 22A on one hand on the second main surface 12b of the base material 12 extends in a meandering manner from the relay land 26B toward one end in the longitudinal direction (i.e., in the Y-axis direction) of the base material 12. The antenna element 22B on the other hand extends in a meandering manner from the relay land 28B toward the other end in the longitudinal direction of the base material 12. The two antenna elements 22A, 22B make up a dipole antenna of the wireless communication device 10. In the case of this embodiment, the respective electrical lengths of the antenna elements 22A, 22B are set to less than a quarter of a wavelength λ of the communication radio wave. In other words, the electrical length of the dipole antenna is set to less than half of the wavelength λ. As a result, the wireless communication device 10 becomes smaller in size (as compared with the case where the respective electrical lengths of the antenna elements 22A, 22B are set to a quarter of the wavelength).

As shown in FIG. 4, a feeding circuit FC of the wireless communication device 10 comprises the RFIC chip 104, inductance elements 106A to 106D and 18A to 18D, and capacitance element 20, that have hereinbefore been described.

Moreover, first and second loop circuits LP1, LP2 are included in the feeding circuit FC.

The first loop circuit (i.e., a first resonant loop) LP1 is a closed circuit (i.e., a loop circuit) having a predetermined resonance frequency that includes the RFIC chip 104 and the four inductance elements 106A to 106D. The RFIC chip 104 contains an internal capacitance C1. Accordingly, the first loop circuit LP1 is an LC parallel resonant circuit parallel to the RFIC chip 104. The inductances L1 to L4 of the inductance elements 106A to 106D included in the first loop circuit LP1 are determined so that the first loop circuit LP1 has a resonance frequency f1 (e.g., approx. 850 MHz).

The second loop circuit (i.e., a second resonant loop) LP2 is a closed circuit (i.e., a loop circuit) having a predetermined resonance frequency that includes the six inductance elements 106C, 106D and 18A to 18D and the capacitance element 20. Accordingly, the second loop circuit LP2 is also the LC parallel resonant circuit parallel to the RFIC chip 104. The inductances L5 to L8 of the inductance elements 18A to 18D included in the second loop circuit LP2 are determined so that the second loop circuit LP2 has a resonance frequency f2 (e.g., approx. 950 MHz) different from the resonance frequency f1.

As shown in FIG. 4, in the feeding circuit FC, the first loop circuit LP1 and the second loop circuit LP2 are connected electrically and share the inductance elements 106C, 106D. Specifically, respective one ends of the inductance elements 106A, 106C, and 18A are connected to one another to make up a T-type circuit. Similarly, respective one ends of the inductance elements 106B, 106D, and 18B are connected to one another to make up a T-type circuit. The three inductance elements 106A, 106C, and 18A making up the T-type circuit perform impedance transformations mutually, while the three inductance elements 106B, 106D, and 18B making up the T-type circuit perform impedance transformations mutually. This allows current to flow through each of the first loop circuit LP1 and the second loop circuit LP2 without great loss and without being greatly biased to one side.

According to the exemplary embodiment, the inductance L1 of the inductance element 106A is set to be greater than the inductance L3 of the inductance element 106C, while the inductance L2 of the inductance element 106B is set to be greater than the inductance L4 of the inductance element 106D. Consequently, the antenna elements 22A, 22B receive radio waves, a potential difference occurs across both ends of the feeding circuit FC shown in FIG. 4 having the relay lands 26A, 28A as input ports, allowing current through the inductance elements 18B, 106D, 106C, and 18A. Since in this current path the inductance elements 106D, 106C are common inductance elements to the first loop circuit LP1 and the second loop circuit LP2, signals are transmitted directly to the RFIC chip 104 at a frequency at which the first loop circuit LP1 resonates, whereas signals from current flowing through the inductance elements 106C, 106D are transmitted to the RFIC ship 104 at a frequency at which the second loop circuit LP2 resonates.

Moreover, the first and second loop circuits LP1, LP2 are parallel resonant circuits each having a different resonance frequency independent of the other. Hence, the wireless communication device 10 is configured to perform wireless communication at a plurality of communication frequencies.

In the case where the respective resonance frequencies of the first and second loop circuits LP1, LP2 are close to each other, for example, when one is approximately 850 MHz and the other is approximately 920 MHz, the communication frequency band of the wireless communication device 10 is widened. That is, not only at frequencies near 850 MHz and near 920 MHz, but also at frequencies therebetween, wireless communication becomes possible at a practical communication distance, resulting in a widened communication frequency band. Such a widened communication frequency band enables the wireless communication device 10 to perform wireless communication at a practical communication distance even if the wireless communication device 10 undergoes manufacturing variations or even if it is used in different countries (i.e., even if the communication frequencies used differ slightly).

When the respective resonance frequencies of the first and second loop circuits LP1, LP2 are apart from each other, for example, when one is approximately 900 MHz and the other is approximately 2.4 GHz, the communication frequency of the wireless communication device 10 turns to multi-frequency. That is, it becomes possible to perform wireless communication at each of two greatly different communication frequencies. By turning the communication frequency to multi-frequency in this manner, the wireless communication device 10 can perform wireless communication with each of a plurality of communication systems whose use communication frequencies differ greatly.

Consequently, since current flows through each of the two loop circuits LP1, LP2 if radio waves are received by the antenna elements 22A, 22B even though the electrical lengths of the antenna elements are small (less than a quarter of the wavelength λ as described above), it becomes possible to receive signals at communication frequencies whose band is widened or which are in the form of a multi-frequency, i.e., at a plurality of communication frequencies. In the case where the electrical length of each of the antenna elements 22A, 22B is a quarter of the wavelength λ, there occurs a series resonance of the antenna elements 22A, 22B (i.e., resonance of the antenna elements), and therefore the wireless communication device 10 can have three resonance frequencies. As a result, the communication frequency has a further widened band (the communication frequency band is further widened) or turns to a further multi-frequency (wireless communication becomes possible at three greatly different communication frequencies).

Figure 6:
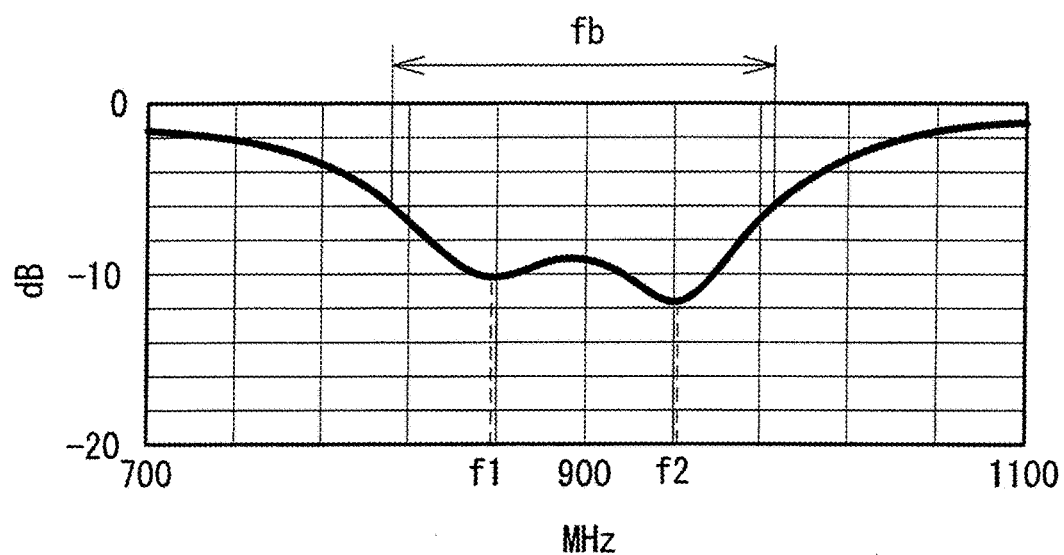
FIG. 6 is a view showing a communication frequency band of the wireless communication device shown in FIG. 1.
Figure 7:
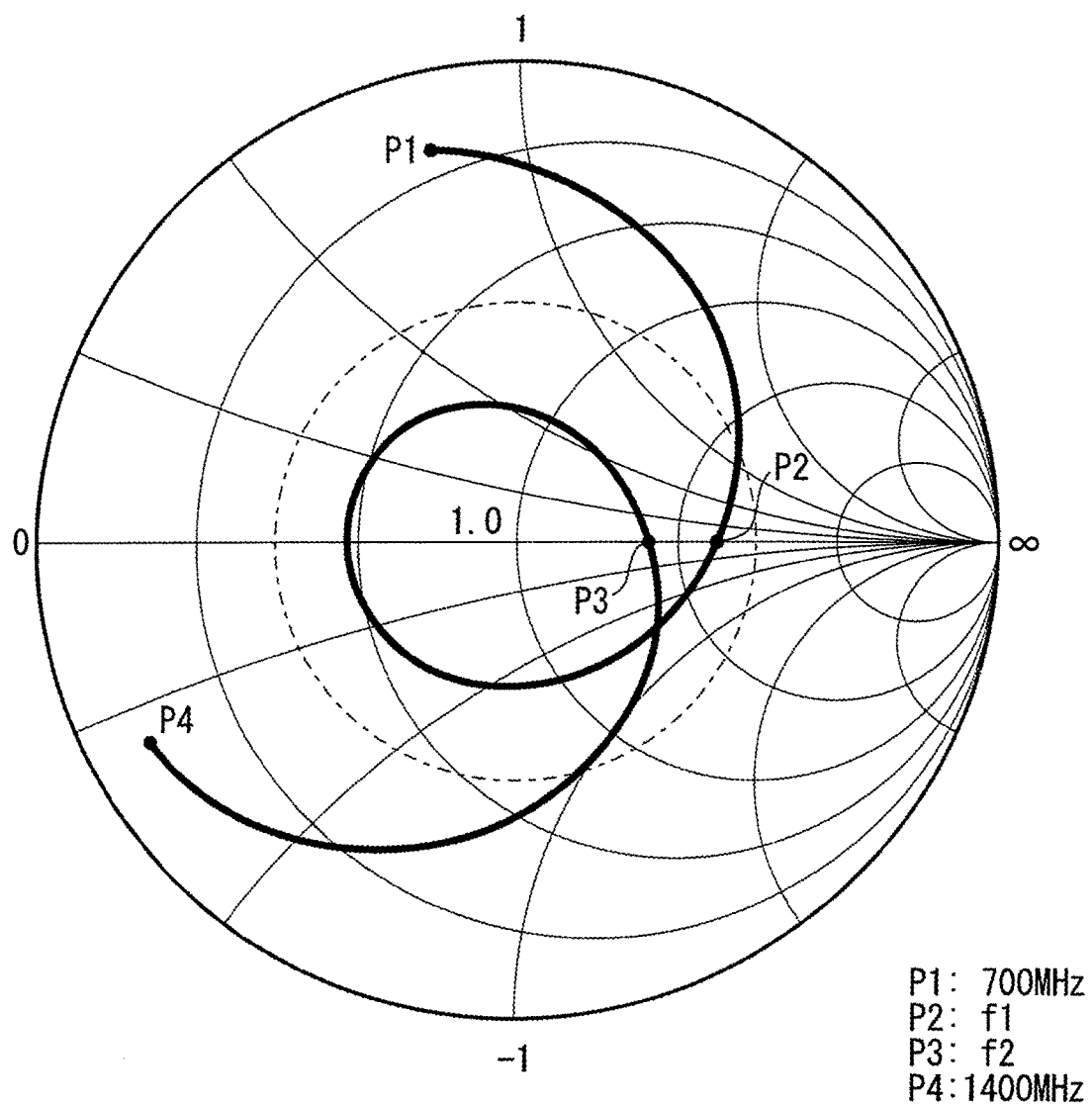
FIG. 7 is a Smith chart showing communication characteristics of the wireless communication device shown in FIG. 1.

FIGS. 6 and 7 show frequency characteristics of the wireless communication device 10 whose communication frequency band is widened. FIG. 6 shows characteristic impedance matching characteristics to frequency. FIG. 7 is a Smith chart. In the Smith chart shown in FIG. 7, a middle point (point designated at 1) between a zero resistance value and an infinite resistance value is 50Ω, with a region inside a dashed-and-dotted line representing a region (a frequency band fb of FIG. 6) where the reflection loss is beyond −6 dB, in which state the radio wave reception has substantially been achieved when the impedance frequency characteristics are viewed from the RFIC chip 104.

As shown in FIG. 6, due to the feeding circuit FC including the two LC parallel resonant circuits (i.e., the first loop circuit LP1 and the second loop circuit LP2), the frequency band of the wireless communication device 10 has its peaks at different frequencies f1 and f2. As shown in FIG. 4, the two LC parallel resonant circuits (i.e., the first loop circuit LP1 and the second loop circuit LP2) share the inductances L3, L4 (i.e., inductance elements 106C, 106D), whereby the characteristic impedance matching state is suppressed from greatly dropping in the band between the two peak frequencies f1, f2. That is, a so-called anti-resonance point occurring between two resonance frequencies is substantially absent. Accordingly, as compared with the case of having either one of the resonance frequencies f1, f2, there is a wide frequency band fb in which a practical wireless communication distance can be obtained so that the reflection loss exceeds −6 dB. As a result, the wireless communication device 10 can have a wide communication frequency band fb.

The feature lies in that as described above, the communication frequency band is widened without setting the electrical length of each of the antenna elements 22A, 22B to the length of a quarter of the wavelength λ. That is, the wireless communication device 10 having two resonance frequencies is realized irrespective of the shape and the size of the antenna elements 22A, 22B. For this reason, the antenna elements 22A, 22B of the wireless communication device 10 can freely be designed with the communication frequency band remaining widened.

For example, as in this embodiment, the electrical length of each of the antenna elements 22A, 22B is set to the length less than a quarter of the wavelength λ (i.e. the electrical length of the dipole antenna composed of these antenna elements is set to the length less than a half of the wavelength λ), whereby the wireless communication device 10 can be downsized.

Alternatively, the electrical length of each of the antenna elements 22A, 22B may be set to the length of a quarter of the wavelength λ so that the wireless communication device 10 can have another resonance frequency. For example, by setting the electrical length of each of the antenna elements 22A, 22B to the length of a quarter of e.g. 2.4 GHz radio wave wavelength, the communication frequency band of the wireless communication device 10 can further be enlarged.

In this manner, according to the exemplary embodiment, the wireless communication device 10 can perform wireless communication at a plurality of communication frequencies without lowering the degree of design freedom of the antenna elements 22A, 22B.

Although the present invention has been described hereinabove by way of the above embodiment, the embodiment of the present invention is not limited thereto.

For example, in the case of the above embodiment, as shown in FIG. 4, the capacitance element 20 is disposed on the base material 12 side. However, it is noted that the exemplary embodiment of the present invention is not limited thereto.

Figure 8:
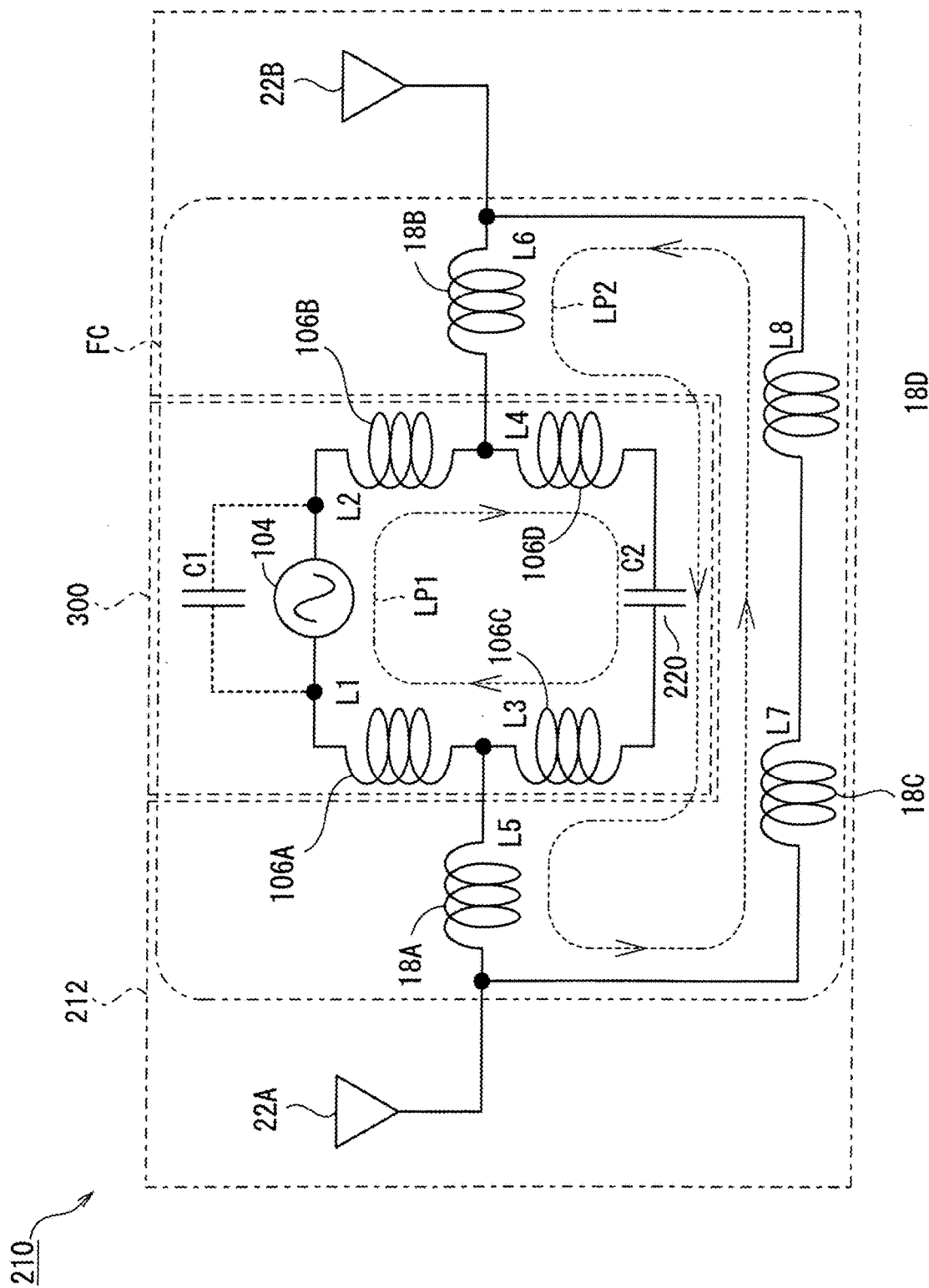
FIG. 8 is a view showing an overall configuration and an equivalent circuit of a wireless communication device according to another exemplary embodiment.

FIG. 8 shows an overall configuration and an equivalent circuit of a wireless communication device according to another exemplary embodiment.

In a wireless communication device 210 shown in FIG. 8, a capacitance element 220 is disposed on an RFIC module 300, not on a base material 212, dissimilar to the capacitance element 20 of the embodiment shown in FIG. 4. Specifically, the inductance elements 106A to 106D and the capacitance element 220 are disposed on the RFIC module 300, while the inductance elements 18A to 18D and the antenna elements 22A, 22B are disposed on the base material 212.

Thus, a first, first loop circuit LP1 as the LC parallel resonant circuit includes the RFIC chip 104, the inductance elements 106A to 106D, and the capacitance element 220. A second, second loop circuit LP2 as the LC parallel resonant circuit includes the inductance elements 18A to 18D, 106C and 106D, and the capacitance element 220. The inductance elements 106C, 106D and the capacitance element 220 are common to and/or shared by the first and second loop circuits LP1, LP2.

Also in the wireless communication device 210 having such a configuration, similar to the wireless communication device 10 of the embodiment shown in FIG. 4, wireless communication can be performed at a plurality of communication frequencies without lowering the degree of design freedom of the antenna elements 22A, 22B.

According to the exemplary embodiment of the wireless communication device 210 shown in FIG. 8, there is no capacitance element on the base material 212, and therefore the counter electrodes of the capacitance element need not be disposed on both the first main surface and the second main surface of the base material 212. By disposing conductor patterns of the inductance elements 18A to 18D and of the antenna elements 22A, 22B on only the main surface on one hand of the base material 212, interlayer connection conductors like the interlayer connection conductors 30, 32 of the wireless communication device 10 shown in FIGS. 2 and 3 need not be disposed on the base material 212.

Furthermore, in another exemplary aspect, only the antenna elements may be disposed on the base material, while the other constituent elements than the antenna elements may be disposed on the RFIC module.

Figure 9:
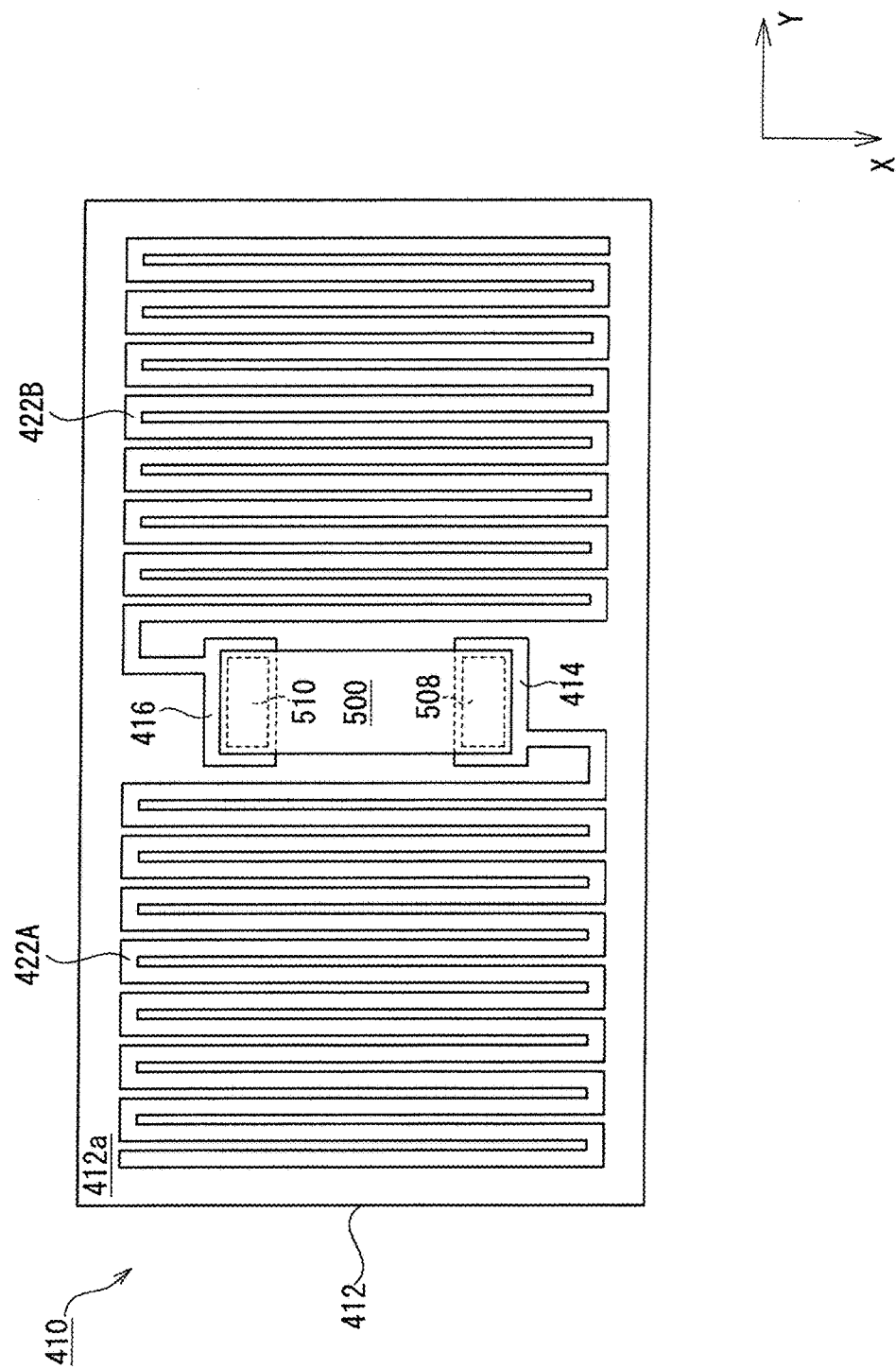
FIG. 9 is a top view of a wireless communication device according to still another exemplary embodiment.
Figure 10:
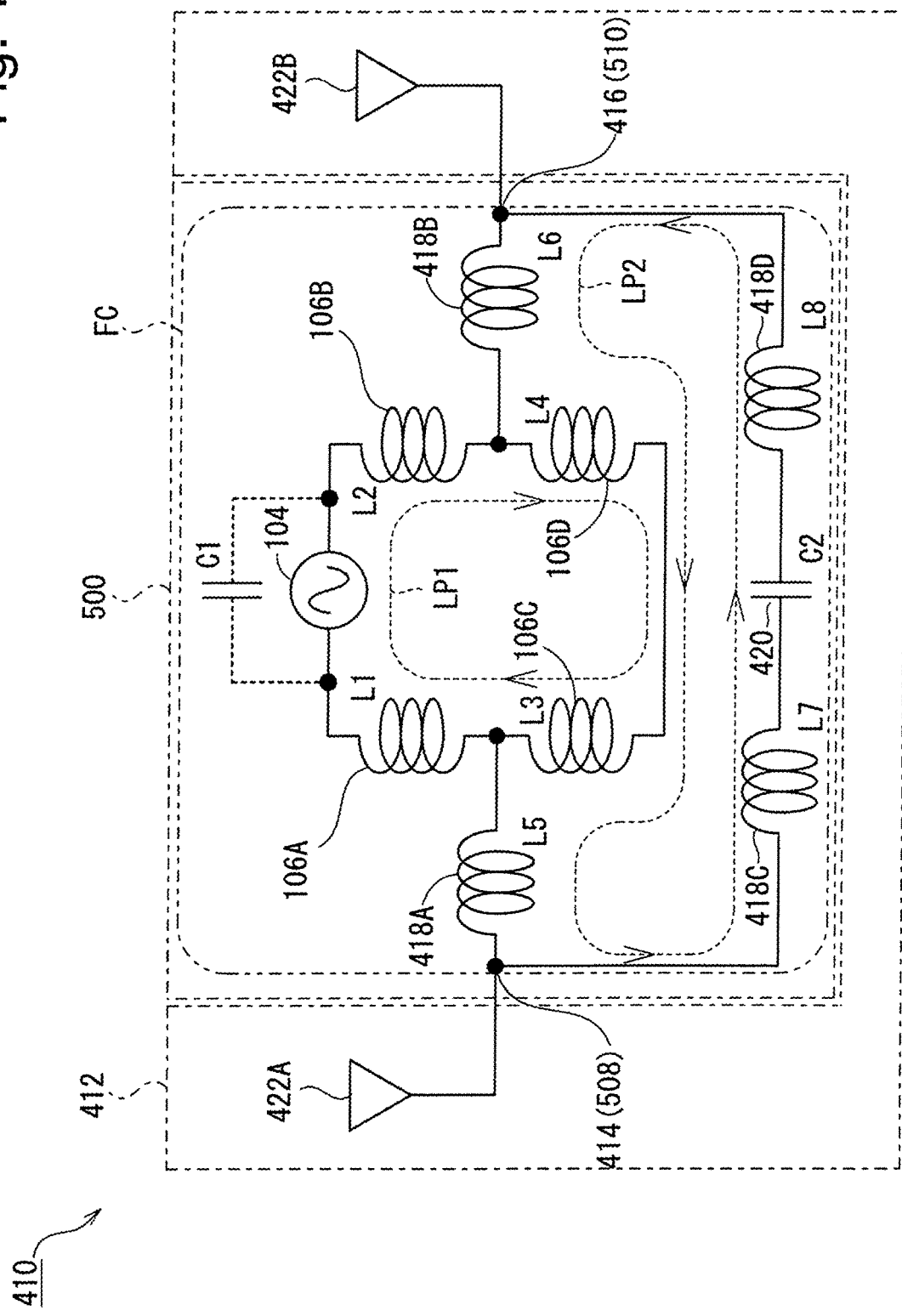
FIG. 10 is a view showing an overall configuration and an equivalent circuit of the wireless communication device shown in FIG. 9.

FIG. 9 is a top view of a wireless communication device according to still another exemplary embodiment. FIG. 10 shows an overall configuration and an equivalent circuit of the wireless communication device shown in FIG. 9.

As shown in FIG. 9, a wireless communication device 410 includes a base material 412, with a first main surface 412a of the base material 412 being mounted with an RFIC module 500. Antenna elements 422A, 422B are disposed as conductor patterns on the main surface 412a of the base material 412.

As shown in FIG. 10, regarding the circuit pattern (i.e., the circuit constituent elements and connection relations there between), the feeding circuit FC of the wireless communication device 410 is the same as that of the wireless communication device 10 shown in FIG. 4. However, all the constituent elements of the feeding circuit FC are disposed within the RFIC module 500. That is, the inductance elements 106A to 106D and 418A to 418D and a capacitance element 420 are disposed on the RFIC module 500, with only the antenna elements 422A, 422B being disposed on the base material 412.

Thus, the first loop circuit LP1 as the LC parallel resonant circuit includes the RFIC chip 104 and the inductance elements 106A to 106D. The second loop circuit LP2 as the LC parallel resonant circuit includes the inductance elements 418A to 418D, 106C, and 106D and the capacitance element 420. The inductance elements 106C, 106D are shared by the first and second loop circuits LP1, LP2.

According to the exemplary embodiment of the wireless communication device 410 shown in FIGS. 9 and 10, the antenna element 422A extends from an input/output pad 414 and the antenna element 422B extends from an input/output pad 416. Specifically, the input/output pad 414 and an external connection terminal 508 connecting thereto act as an antenna port for connection to the antenna element 422A. The input/output pad 416 and an external connection terminal 510 connecting thereto act as an antenna port for connection to the antenna element 422B.

Similar to the wireless communication device 10 of the embodiment shown in FIG. 4, such a wireless communication device 410 is also configured to perform wireless communication at a plurality of communication frequencies without lowering the degree of design freedom of the antenna elements 422A, 422 B.

Similarly, also with respect to the wireless communication device 210 of the exemplary embodiment shown in FIG. 8, all the constituent elements of the feeding circuit FC thereof may be disposed within the RFIC module 300 and only the antenna elements 22A, 22B may be disposed on the base material 212.

Furthermore, in the case of the above exemplary embodiment, as shown in FIGS. 2 and 5, the inductance elements 18A to 18D, 106A to 106D and the capacitance element 20 are disposed as the conductor patterns on the RFIC module or on the base material, but for example some may be disposed as chips thereon.

Furthermore, in the case of the above exemplary embodiment, as shown in FIG. 3, the antenna elements 22A, 22B each extend in a meandering manner and make up a dipole antenna. However, it is noted that the embodiment of the present invention is not limited thereto. For example, a folded dipole antenna may be made up of antenna elements.

In addition, in the case of the above exemplary embodiment, as shown in FIG. 4, the first loop circuit in the feeding circuit FC makes up an LC resonant parallel circuit by the presence of the internal capacitance of the RFIC chip 104. However, it is noted that the embodiment of the present invention is not limited thereto. For example, the first loop circuit may include a capacitance element configured from a conductor pattern.

That is, in a broad sense, the wireless communication device of the exemplary embodiment according to the present invention is a wireless communication device having a feeding circuit including an RFIC chip; and an antenna element connected to the feeding circuit. Moreover, the feeding circuit includes a first resonant loop including the RFIC chip and a plurality of inductance elements; and a second resonant loop including a capacitance element and a plurality of inductance elements. In the plurality of inductance elements in the first resonant loop and the plurality of inductance elements in the second resonant loop, a shared inductance element is included that is shared by the first resonant loop and the second resonant loop, and wherein the second resonant loop includes an antenna port for connection to the antenna element.

Although the exemplary embodiment of the present invention have been described above, it will be apparent to those skilled in the art that at least one embodiment may wholly or partly be combined with a certain embodiment to obtain a further embodiment according to the present invention.

EXPLANATIONS OF REFERENCE LETTERS OR NUMERALS 10 wireless communication device
18A inductance element
18B inductance element
18C inductance element
18D inductance element
20 capacitance element
22A antenna element
22B antenna element
104 RFIC chip
106A inductance element
106B inductance element
106C inductance element
106D inductance element
FC feeding circuit
LP1 first resonant loop (first loop circuit)
LP2 second resonant loop (second loop circuit)

What is claimed:

1. A wireless communication device comprising:
   a feeding circuit having a first resonant loop including an RFIC chip and a first plurality of inductance elements, and a second resonant loop including a capacitance element and a second plurality of inductance elements;
   an antenna element coupled to the feeding circuit; and
   a T-type circuit including an inductance element included in only the first resonant loop, an inductance element included in only the second resonant loop, and a shared inductance element,
   wherein, in the first plurality of inductance elements in the first resonant loop and the second plurality of inductance elements in the second resonant loop, the shared inductance element is shared by the first resonant loop and the second resonant loop, and
   wherein the second resonant loop includes an antenna port coupled to the antenna element.

2. The wireless communication device of claim 1, wherein in the respective inductance elements and the shared inductance element of the T-type circuit, an inductance of the inductance element included in only the first resonant loop is larger than an inductance of the shared inductance element.

3. The wireless communication device of claim 1, wherein the feeding circuit includes:
   a first inductance element included in only the first resonant loop and having a first end connected to a first input/output terminal of the RFIC chip;
   a second inductance element included in only the first resonant loop and having a first end connected to a second input/output terminal of the RFIC chip;
   a third inductance element that is the shared inductance element and having a first end connected to a second end of the first inductance element;
   a fourth inductance element that is the shared inductance element and having a first end connected to a second end of the second inductance element and a second end connected to a second end of the third inductance element;
   a fifth inductance element included in only the second resonant loop and having a first end connected to the second end of the first inductance element;
   a sixth inductance element included in only the second resonant loop and having a first end connected to the second end of the second inductance element;
   a seventh inductance element having a first end connected to a second end of the fifth inductance element and a second end connected to a first end of the capacitance element; and
   an eighth inductance element having a first end connected to a second end of the sixth inductance element and a second end connected to a second end of the capacitance element.

4. The wireless communication device of claim 3, wherein the first resonant loop includes the first to fourth inductance elements and the RFIC chip and the second resonant loop includes the third to eighth inductance elements and the capacitance element.

5. The wireless communication device of claim 4, wherein the antenna port is disposed between the fifth inductance element and the seventh inductance element and between the sixth inductance element and the eighth inductance element.

6. The wireless communication device of claim 5, further comprising an RFIC module comprising a multilayer substrate on which the RFIC chip is mounted and on which the first to fourth inductance elements are disposed as conductor patterns.

7. The wireless communication device of claim 6, further comprising a base material on which the RFIC module is mounted and on which the antenna element, the fifth to eighth inductance elements, and the capacitance element are disposed as conductor patterns.

8. The wireless communication device of claim 5, further comprising an RFIC module comprising a multilayer substrate on which the RFIC chip is mounted and on which the first to eighth inductance elements and the capacitance element are disposed as conductor patterns.

9. The wireless communication device of claim 8, further comprising a base material on which the RFIC module is mounted and on which the antenna element is disposed as a conductor pattern.

10. The wireless communication device of claim 1, wherein the feeding circuit includes:
    a first inductance element included in only the first resonant loop and having a first end connected to a first input/output terminal of the RFIC chip;

a second inductance element included in only the first resonant loop and having a first end connected to a second input/output terminal of the RFIC chip;

a third inductance element being the shared inductance element and having a first end connected to a second end of the first inductance element and a second end connected to a first end of the capacitance element;

a fourth inductance element being the shared inductance element and having a first end connected to a second end of the second inductance element and a second end connected to a second end of the capacitance element;

a fifth inductance element included in only the second resonant loop and having a first end connected to a second end of the first inductance element;

a sixth inductance element included in only the second resonant loop and having a first end connected to a second end of the second inductance element;

a seventh inductance element having a first end connected to the a second end of the fifth inductance element; and an eighth inductance element having a first end connected to a second end of the sixth inductance element and a second end connected to a second end of the seventh inductance element.

11. The wireless communication device of claim 10, wherein the first resonant loop includes the first to fourth inductance elements, the RFIC chip, and the capacitance element, and the second resonant loop includes the third to eighth inductance elements and the capacitance element.

12. The wireless communication device of claim 11, wherein the antenna port is disposed between the fifth inductance element and the seventh inductance element and between the sixth inductance element and the eighth inductance element.

13. The wireless communication device of claim 12, further comprising an RFIC module comprising a multilayer substrate on which the RFIC chip is mounted and on which the first to fourth inductance elements and the capacitance element are disposed as conductor patterns.

14. The wireless communication device of claim 13, further comprising a base material on which the RFIC module is mounted and on which the antenna element and the fifth to eighth inductance elements are disposed as conductor patterns.

15. The wireless communication device of claim 12, further comprising an RFIC module comprising a multilayer substrate on which the RFIC chip is mounted and on which the first to eighth inductance elements and the capacitance element are disposed as conductor patterns.

16. The wireless communication device of claim 15, further comprising a base material on which the RFIC module is mounted and on which the antenna element is disposed as a conductor pattern.

17. The wireless communication device of claim 1, wherein an electrical length of the antenna element is less than a half of wavelength of a communication radio wave.

18. The wireless communication device of claim 1, wherein the antenna element is configured as a dipole antenna.

19. A wireless communication device comprising:
a first resonant loop that includes an RFIC chip and a first plurality of inductance elements;
a second resonant loop that includes a second plurality of inductance elements and a capacitance element;
a common inductance element that is shared between the first resonant loop and the second resonant loop; and
an antenna element that is coupled to an antenna port included in the second resonant loop,
wherein the common inductance element configures the first resonant loop to transmit signals from current flowing through the first plurality of inductance elements at a first frequency at which the first resonant loop is configured to resonate, and
wherein the common inductance element configures the second resonant loop to transmit signals from current flowing through the second plurality of inductance elements at a second frequency at which the second resonant loop is configured to resonate with the second frequency being a different frequency than the first frequency.

20. The wireless communication device of claim 19, further comprising a T-type circuit including an inductance element included in only the first resonant loop, an inductance element included in only the second resonant loop, and the common inductance element that is shared between the first resonant loop and the second resonant loop.

* * * * *